United States Patent [19]

Simonson et al.

[11] 4,176,851
[45] Dec. 4, 1979

[54] CHILD'S BUMPER BIKE

[76] Inventors: Robert C. Simonson, 258 N. Arnez, Minor Oaks; Ruben J. Stroud, 602 N. Fulton, both of Ojai, Calif. 93023

[21] Appl. No.: 926,409

[22] Filed: Jul. 20, 1978

[51] Int. Cl.² .............................................. B62K 9/00
[52] U.S. Cl. .................................. 280/259; 280/205; 280/282
[58] Field of Search ................ 280/259, 205, 282, 239

[56] References Cited

U.S. PATENT DOCUMENTS

| 2,920,904 | 1/1960 | Doud et al. | 280/205 |
| 3,062,559 | 11/1962 | Hewitt | 280/282 |
| 3,438,649 | 4/1969 | Schermerhorn et al. | 280/259 |
| 3,829,127 | 8/1974 | McLellan | 280/205 |
| 3,857,583 | 12/1974 | Vanover | 280/282 |

Primary Examiner—Joseph F. Peters, Jr.
Assistant Examiner—Donn M. McGiehan
Attorney, Agent, or Firm—Pastoriza & Kelly

[57] ABSTRACT

The child's bumper cycle is similar to a conventional child's tricycle except that a 360° bumper ring lying in a horizontal plane completely surrounds the single main wheel of the cycle to replace the normal smaller rear wheels. The ring itself has four caster wheels spaced at 90° to prevent the cycle from tipping over. The 360° ring also serves as a bumper ring for the cycle.

2 Claims, 3 Drawing Figures

CHILD'S BUMPER BIKE

BACKGROUND OF THE INVENTION

This invention relates generally to cycles and more particularly to a child's bumper cycle that cannot tip over.

The conventional child's tricycle has been around for many decades and has proved a most popular toy for children. While the tricycle itself is fairly stable as compared to conventional bicycles, it can still tip over in a dangerous manner to injure a child. In this respect, the tipping takes place about the larger front wheel and one or the other of the rear wheels in an oblique forward direction.

While training wheels have been proposed for securement to conventional bicycles to stabilize the same, none so far as we are aware have been applied to a tricycle in a manner to inhibit tipping over of the tricycle.

Another problem associated with children's tricycles is damage to furniture and the like when the tricycle is pedaled about the floor of a home. In fact, collisions with furniture often result in the tricycle tipping over as described heretofore.

SUMMMARY OF THE PRESENT INVENTION

With the foregoing in mind, the present invention contemplates an improved cycle for children having essentially the major advantages of the conventional tricycle but so designed that it will not tip over. Moreover, the same structure inhibiting tipping over of the bicycle serves as a bumper ring for protecting furniture and the like when the cycle is pedaled about a home.

More particularly, the bumper cycle of this invention includes a cycle frame supporting a steering wheel, seat and handlebars similar to a conventional tricycle. Rather than smaller rear wheels, there is provided a 360° circular bumper ring lying in a horizontal plane completely surrounding the forward main wheel. A plurality of circumferentially spaced caster wheels in turn are mounted on the bumper ring thereby preventing tipping over of the cycle as well as providing a bumper over 360°.

BRIEF DESCRIPTION OF THE DRAWINGS

A better understanding of this invention will be had by referring to the accompanying drawings in which.

DETAILED DESCRIPTION OF THE PREFERRED EMBODIMENT

Figure 1:
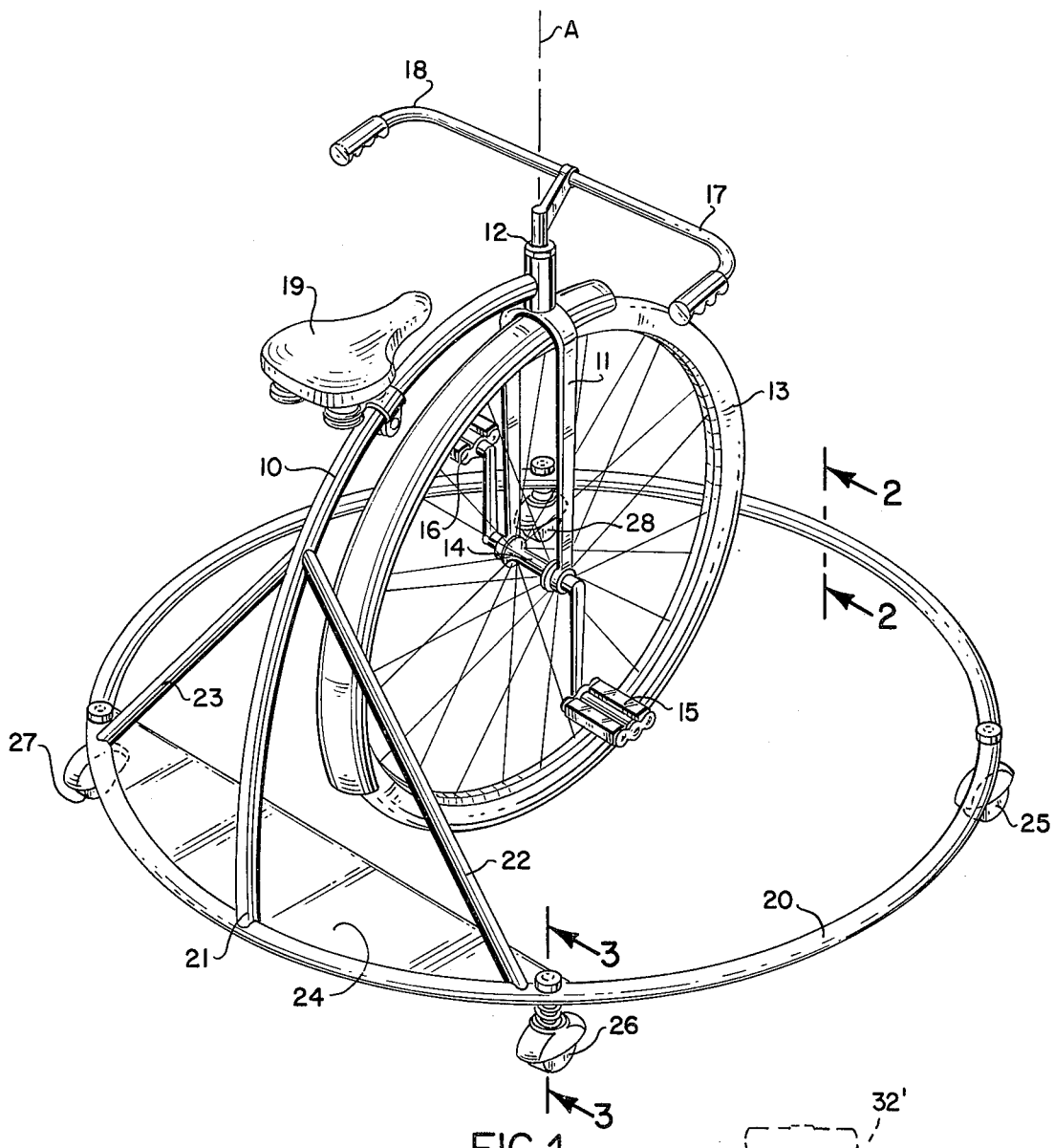
FIG. 1 is a rear perspective view of a preferred embodiment of the child's bumper cycle of this invention.

Referring to FIG. 1, the child's bumper cycle includes a cycle frame in the form of a curved tube member 10 lying in a vertical plane. A steering fork 11 is journalled in the upper forward portion of the frame member 10 as shown at 12 and rotatably supports a wheel 13 at its central axle 14. Wheel pedals 15 and 16 are provided as shown.

Handlebars 17 and 18 are secured to the upper portion of the fork 11 at the point it extends above the journal 12. A child's seat 19 in turn is mounted on the frame member 10 to the rear of the journal 12.

The child's cycle is completed by the provision of a 360° integral bumper ring 20 lying in a horizontal plane at a given distance above the ground below the steering fork 11. This ring is secured to the lower rear end portion of the frame member as indicated at 21. The frame for the cycle in the preferred embodiment includes rear right and left straight tube members 22 and 23 forming an inverted V with the vertex of the V being connected to a mid-point on the curved frame tube 10 as shown. The diverging downwardly extending legs defined by the tube members 22 and 23 in turn connect to circumferentially spaced points on the ring 20 and thus stabilize the curved tube member 10.

In the embodiment of FIG. 1 there is also provided a rear platform 24 secured to an arcuate rear portion of the bumper ring 20. The forward edge of this platform lies on a chord of the ring, the terminal points of the chord being adjacent to the connection points of the straight tubes 22 and 23 as illustrated.

A plurality of caster wheels, preferably four circumferentially spaced at 90° connect to the ring 20 as illustrated at 25, 26, 27 and 28. It will be evident that by placing these caster wheels at 90° intervals on the ring 20, the cycle is inhibited from tipping over. Moreover, since the ring 20 extends 360° completely around the cycle, it serves as an ideal bumper.

Figure 2:
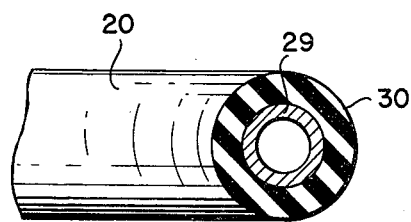
FIG. 2 is a fragmentary cross section taken in the direction of the arrows 2—2 of FIG. 1; and, FIG. 3 is another fragmentary cross section taken in the direction of the arrows 3—3 of FIG. 1.

With respect to the foregoing, and with particular reference to FIG. 2, it will be noted that the circular bumper ring 20 comprises an inner metal tube 29 surrounded by a cushioning material 30 such as soft rubber. By providing this cushioning material, damage to furniture and the like is minimized.

Figure 3:
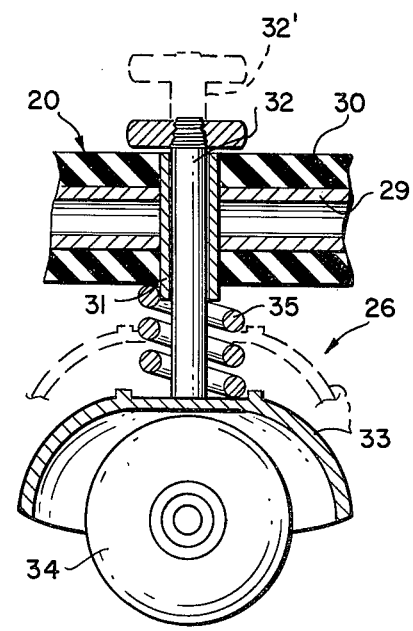

Referring now to FIG. 3, there is illustrated one of the caster wheels such as 26. Since all four caster wheels are identical, a detailed description of one will suffice for all.

As shown in FIG. 3, the structure includes a sleeve 31 secured to the metal portion 29 of the ring 20, this sleeve supporting a vertical stem 32 for the caster wheel. As illustrated, the lower portion of the stem 32 connects to a fender structure 33 supporting the wheel 34.

The foregoing assembly is completed by the provision of a shock absorbing spring 35 positioned between the upper portion of the fender 33 and the underside of the ring 20. As indicated by the phantom line 32' for the stem 32, the caster wheel can move upwardly against the bias of the spring 35 within the sleeve 31 to thus absorb shocks.

From all of the foregoing, it will be evident that the present invention provides a very useful and unique child's cycle. The 360° ring with the caster wheels not only serves as a bumper as described but also prevents tipping over of the cycle. Moreover, the platform 24 will serve as a step for other children so that they can ride on the rear of the cycle as in the case of conventional children's tricycles.

Various minor changes falling within the scope and spirit of this invention will occur to those skilled in the art. The child's bumper cycle is accordingly not to be thought of as limited to the exact structure set forth for illustrative purposes.

We claim:

1. A child's bumper cycle that cannot tip over including, in combination:

(a) a cycle frame;

(b) a steering fork journalled in a forward end of said frame for steering movements about a generally vertical axis;

(c) a single wheel rotatably mounted in said steering fork;

(d) pedals on said wheel;

(e) handlebars secured to said steering fork;

(f) a seat mounted on a portion of said frame to the rear of said handlebars;

(g) an integral bumper ring secured to said frame in a horizontal plane at a given distance above the ground below said steering fork and including a resilient cushioning material;

(h) four individual caster wheels coupled to said ring at 90° circumferentially spaced positions engaging the ground to inhibit tipping over of said cycle frame and also serve as a 360° bumper; and (i) a rear platform secured to an arcuate rear portion of said bumper ring, the forward edge of said platform lying on a chord of said ring, said cycle frame including a single curved tube member lying in a vertical plane having one end secured to the central rear portion of said bumper ring and its other end extending upwardly and forwardly to terminate in the journal for said steering fork, said frame further including rear right and left straight tube members forming an inverted V, the vertex of said V being connected to a mid point on said curved tube and the diverging downwardly extending legs secured at circumferentially spaced points on said bumper ring adjacent to the terminal points of said chord to stabilize said curved tube member.

2. A child's cycle according to claim 1, in which each of said caster wheels includes spring mounting means for mounting the casters to said ring to absorb shocks.

* * * * *